(12) United States Patent
Tsuchida

(10) Patent No.: US 6,972,925 B2
(45) Date of Patent: Dec. 6, 2005

(54) MINIATURIZED VIDEO CASSETTE CAMERA INCLUDING A ROTATABLE GRIP MEMBER

(75) Inventor: Yoshihisa Tsuchida, Chiba (JP)

(73) Assignee: Sony Corporation, Tokyo (JP)

( * ) Notice: Subject to any disclaimer, the term of this patent is extended or adjusted under 35 U.S.C. 154(b) by 9 days.

(21) Appl. No.: 10/473,849

(22) PCT Filed: Feb. 7, 2003

(86) PCT No.: PCT/JP03/01343

§ 371 (c)(1),
(2), (4) Date: Oct. 2, 2003

(87) PCT Pub. No.: WO03/069896

PCT Pub. Date: Aug. 21, 2003

(65) Prior Publication Data

US 2004/0169955 A1    Sep. 2, 2004

(30) Foreign Application Priority Data

Feb. 13, 2002    (JP) .............................. 2002-035527

(51) Int. Cl.[7] ............................................ G11B 5/027
(52) U.S. Cl. .......................................... 360/85; 360/93
(58) Field of Search .................................. 360/81–101

(56) References Cited

U.S. PATENT DOCUMENTS

| 4,772,902 A | * | 9/1988 | Inoue et al. | ................. 396/423 |
| 5,043,822 A | * | 8/1991 | Ichiyoshi et al. | ........... 348/376 |
| 5,303,062 A | * | 4/1994 | Kawarai et al. | ............ 386/118 |
| 5,381,179 A | * | 1/1995 | Kashimura | ................... 348/376 |

FOREIGN PATENT DOCUMENTS

JP    62-105579    *    5/1987

* cited by examiner

Primary Examiner—A. J. Heinz
(74) Attorney, Agent, or Firm—Jay H. Maioli

(57) ABSTRACT

A video camera having a camera body unit including a lens, a view finder, and a group of operation buttons. Also included is a battery housing unit that can function as a grip unit and that is provided to be rotatable in a vertical direction to one side of the camera body unit through a rotational axis and that is equipped with a lock mechanism so as to be maintained in a lock state at a preset position. In this way the camera body unit can be miniaturized to be convenient for carrying, and further the battery housing unit can be used as the grip unit, so that it is possible to improve the operability without destroying the design.

5 Claims, 5 Drawing Sheets

MINIATURIZED VIDEO CASSETTE CAMERA INCLUDING A ROTATABLE GRIP MEMBER

This application is a 371 of PCT/JP03/01343 Feb. 7, 2003

TECHNICAL FIELD

The present invention relates, for example, to a magnetic recording and/or reproducing apparatus such as a digital camera, a build-in video type camera and the like having a grip unit being installed to be open/close or to be freely rotatable relative to a camera body unit.

BACKGROUND ART

Conventionally, as this kind of a build-in video type camera having a grip unit being installed to be open/close or to be freely rotatable, one having a configuration as disclosed in Japanese Patent Laid-Open No. 6-133197 is well known. The invention of this conventional build-in video type camera tries to solve problems, wherein as a commonly used camera is so arranged to be held its main body with a single hand, it is not able to realize a low profile model because a space depending on a size of a human hand for holding is necessary in a widthwise direction in addition to a mounting space for original parts, and a vibration is tend to be occurred upon camera operation because the camera is held with a single hand.

As a specific configuration for them, it has a configuration in which an independent grip unit is installed to be rotatable in a lateral direction in front of a main body including a camera unit and a deck unit, and its grip unit is configured to be fixed at respective position of a front portion and a side face portion, and accordingly by providing above mentioned grip unit, a space for a widthwise direction depending on the size of a human hand for holding becomes not necessary, and the main body can be made to be a low profile.

In addition, the rotatable grip unit is so configured to attach a battery for a power supply in the grip unit, to make a power on/off in conjunction with the rotation of the grip unit, to have a function of a lens cover to the grip unit, to build in a microphone in the grip unit, and to provide a start switch and a zoom switch to the grip unit.

In an actual use, a lens unit is disposed by opening the grip unit in the lateral direction from the main body and fixing, the power for driving is made on, and the start switch and the zoom switch are operated, and accordingly in this case, the grip unit is fixed in a state where it is opened in the lateral direction while protruding, then its grip unit is grasped from a crosswise direction so as to pick by one of hands, and the zoom switch can be operated by attaching the other hand to the main body, so that a hand vibration does not occur.

However, in such build-in video type camera of this conventional embodiment, it is only the one in which the main body is merely made thinner by eliminating the space of the crosswise direction for holding depending upon a size of a human hand, so that even if the grip unit which is provided to be open/close towards a front face side is fixed to be an open state, it is not able to grasp the grip unit with a palm so that the finger wraps the grip unit by one round, and accordingly it has to be held so as to grasp while giving force to a finger-tip from one side. To hold by grasping while giving force to the finger-tip gives an excessive tiredness even for not so long time, and it is impossible to inevitably hold stably without attaching hands. In brief, it is rather inferior compared with a commonly used build-in video type camera in a point of difficulty in holding with a single hand.

Further, in order to stably grasp the grip unit and to provide the start switch and the zoom switch, it is necessary to have a length and a profile in some measure, and rather requires a height in upward and downward directions and a length in a forward and backward directions by just that much, and although a low profile model has been achieved but an actual miniaturization has not been achieved.

In such configuration where the grip unit is installed at the front face side as to have the function of the lens cover and the function of making a power on/off in conjunction with the rotation of the grip unit, it is impossible to use if the grip unit is made in a state where it is completely opened from the main body, so that there is an inconvenience in which a mode of use are limited to a single pattern.

In addition, in a build-in video type camera where a camera body unit does not have a grip unit to be open/close, and is generally held as to cover the right side with a palm, it is easy to miniaturize the whole, but there exists a problem wherein a finger of a hand for holding the camera body unit reaches the left side of the camera body unit, or even passes over the operation switch and the group of buttons provided on the right side of the camera body unit, so that it becomes a configuration to be rather hard to be operated.

Furthermore, by miniaturizing the camera body unit, the surface area for arranging each devices such as the battery, the liquid crystal panel, the cassette installing unit, the group of operation switches and the like becomes smaller, and if each devices are tried to be arranged within the limited surface area, it is forced to go with a similar design as a whole.

Therefore, in the build-in video type camera of the conventional embodiment, there are solving problems to miniaturize a camera body unit, to improve the operability by arranging effectively each devices even if the surface area becomes smaller by miniaturizing, and to avoid the mode of use to be a single pattern.

DISCLOSURE OF THE INVENTION

As a specific means to solve the problem of the above-mentioned conventional embodiment, the present invention is a magnetic recording and/or reproducing apparatus which comprises, at least, a camera body unit including a lens, a view finder and a group of operation buttons, and a grip unit installed to be open/close or to be freely rotatable relative to the above mentioned camera body unit while combining with a battery housing unit, and is to present a magnetic recording and/or reproducing apparatus characterized in which the above mentioned battery housing unit is installed to be rotatable in a vertical direction through an axis on one side of the camera body unit, and a lock mechanism is held to be locked state at a position is provided.

In the present invention, the followings are included as additional requirements, that is, the battery is installed externally to the above mentioned grip unit; preset positions are a housing position of the grip unit, an in-use position thereof, and a install/eject position of a cassette tape; a setting mechanical unit for a tape cassette in the camera body is provided at a position to be covered when the grip unit is housed; a lock mechanism comprises at least a slide ring having a locking pawl member and a lock disk having a plurality of cutout portions to be engaged with the locking pawl member, and a lock operating button capable of releasing a lock state.

The magnetic recording and/or reproducing apparatus according to the present invention is so configured in which the camera body unit and the battery housing unit which is combined with the grip unit are separately formed, and the battery housing unit is provided to be rotatable in the vertical direction through the rotational axis at one side relative to the camera body unit, and is equipped with the lock mechanism to be maintained in a locked state at a preset position, and accordingly, when the camera body unit is miniaturized, it is possible not only to effectively arrange each devices, and to improve the operability without destroying limitation in a design, but also to be easy in handling by setting the grip unit at the in-use position even when the camera body unit is miniaturized.

THE BEST MODE FOR CARRYING OUT THE INVENTION

Next, the present invention is explained based on an illustrated specific mode for carrying out.

Figure 1:
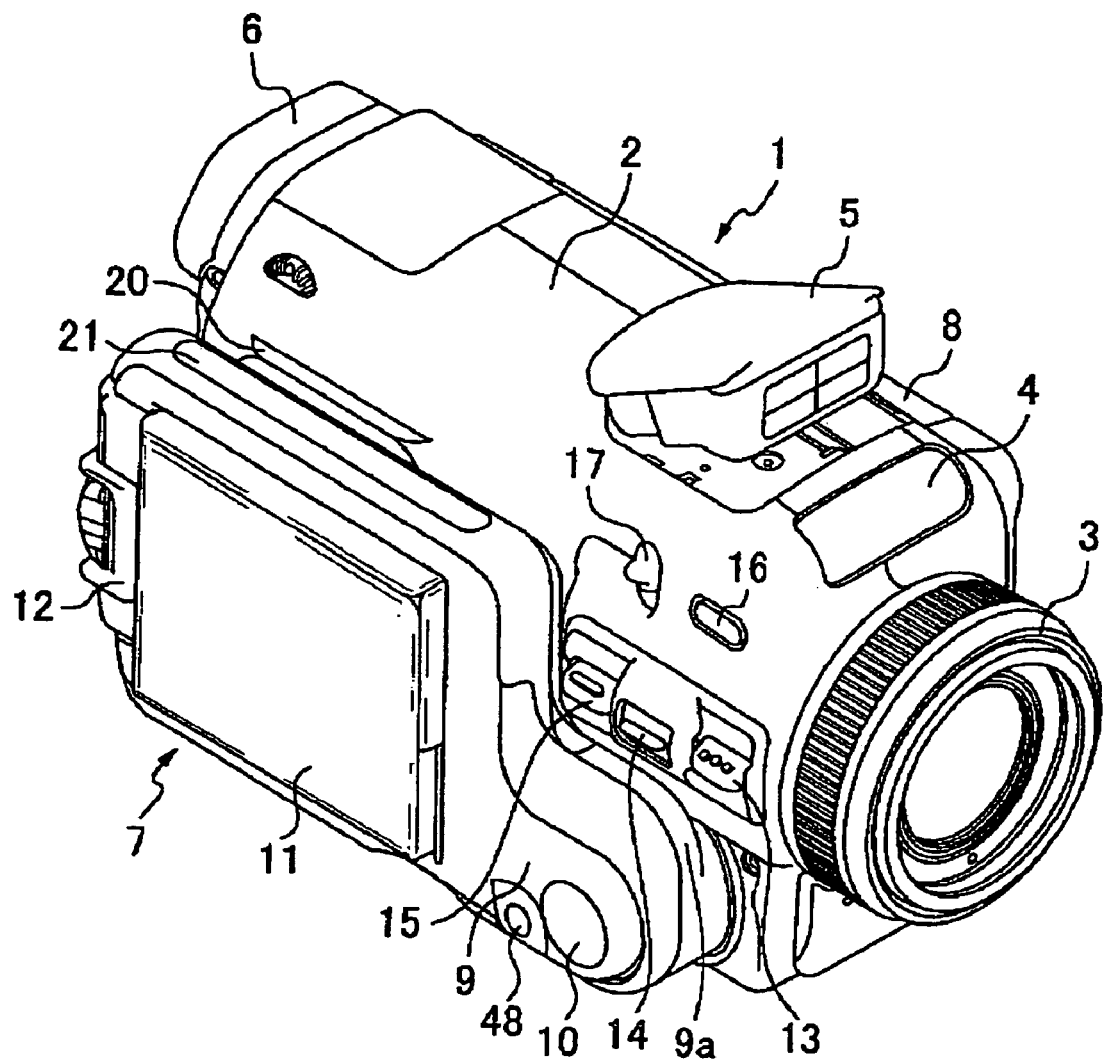
FIG. 1 is a perspective view showing a state where a grip unit is housed in a magnetic recording and/or reproducing apparatus of a build-in video type camera relating to a mode for carrying out according to the present invention.
Figure 2:
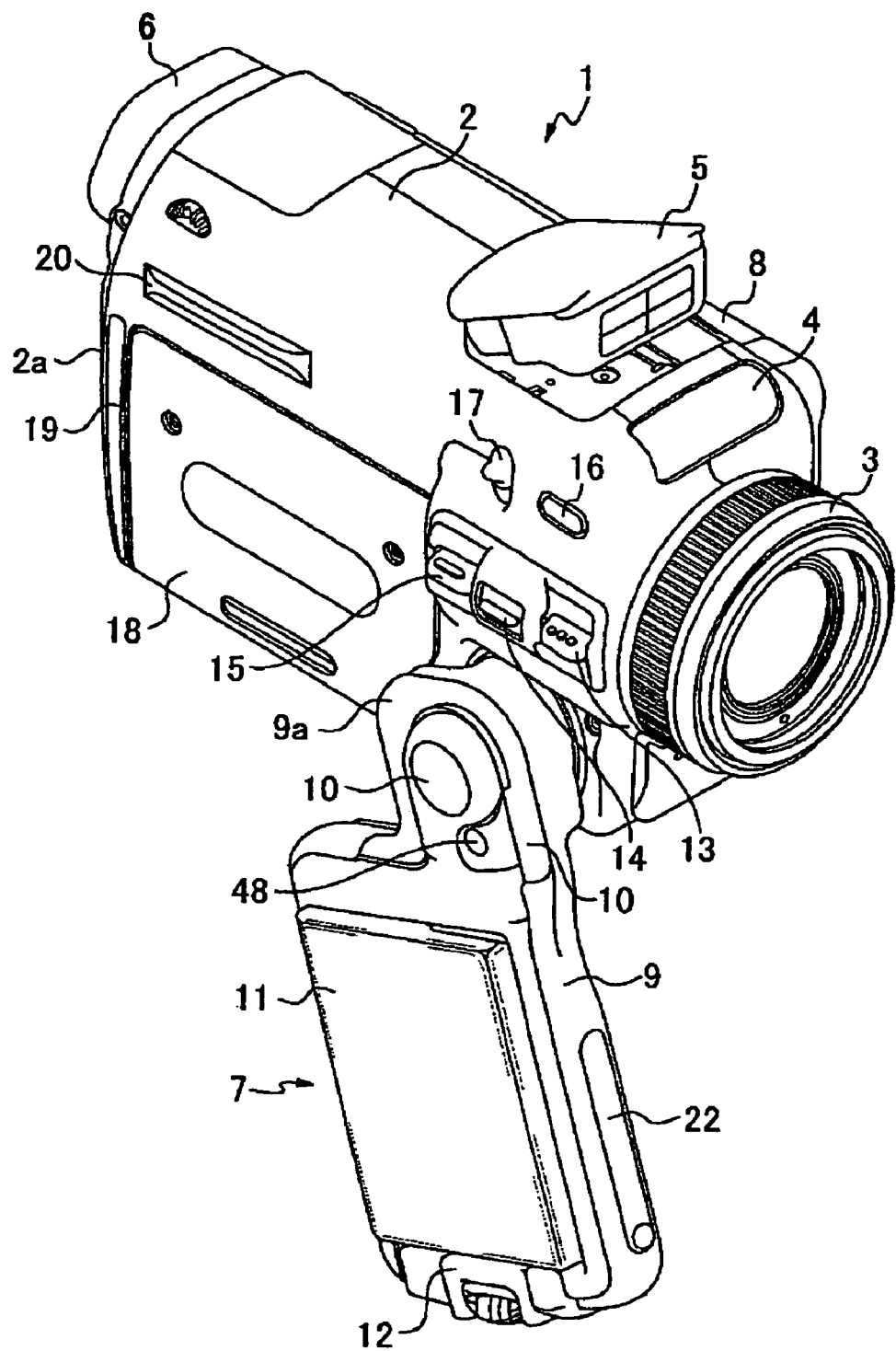
FIG. 2 is a perspective view showing an in-use state where the grip unit is opened in the same magnetic recording and/or reproducing apparatus.
Figure 3:
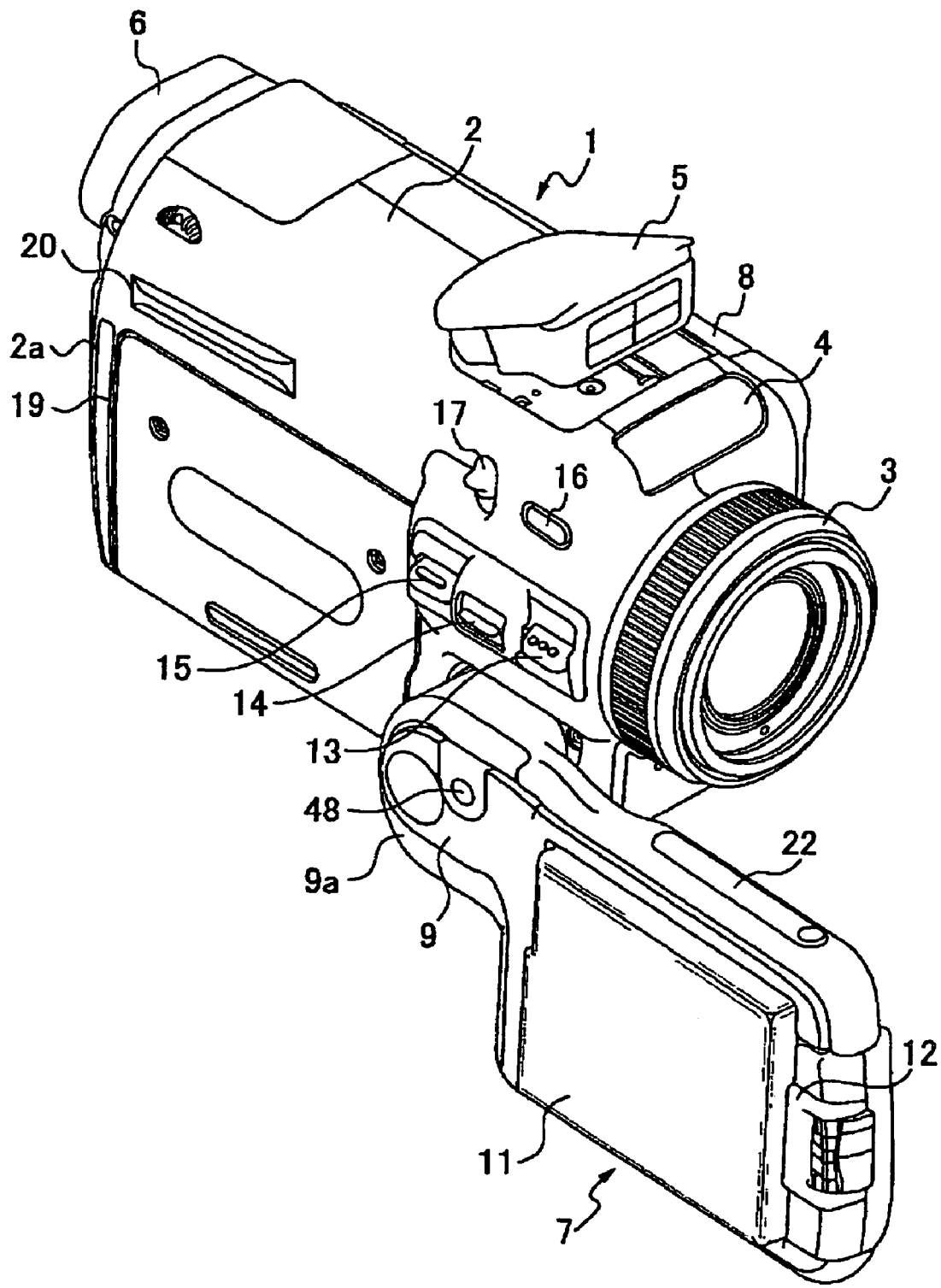
FIG. 3 is a perspective view showing a state of an install/eject position for a cassette tape while the grip unit is further opened in the same magnetic recording and/or reproducing apparatus.

At first, a magnetic recording and/or reproducing apparatus 1 relating to the mode for carrying out as designated in FIGS. 1 to 3 is a so-called build-in video type camera, and a lens unit 3 is installed at a front side of a camera body unit 2, a microphone 4 is installed at an upper rim of the front side thereof, and further, a strobe 5 is installed capable of being pop up/down at an upper face portion of the front side, and at a back face side, a view finder 6 is installed to be rotatable in upward and downward directions within a predetermined angle range.

A grip unit 7 which is combined with a battery housing unit is provided to be rotatable at one side (right side) of this camera body unit 2, and a display unit 8 comprising a liquid crystal panel is provided to be open/close and to be rotatable at the other side (left side).

The grip unit 7 is so installed wherein a case part 9 thereof is installed to be rotatable at a front face side and a lower portion of the camera body unit 2 through an axis unit 10, and the rotation thereof is so arranged to be rotated in a vertical direction, for example, from an approximately horizontal position in a housed state as shown in FIG. 1 seen from a side face through the in-use position as shown in FIG. 2 to, further, an approximately horizontal position of a front side where it is positioned upon installing/ejecting a magnetic tape cassette as shown in FIG. 3 in an angle range of 180 degrees.

This grip unit 7 is combined with a housing (installation) of the battery 11, and the battery 11 can be externally installed to the case part 9 partly in fitting in. In this case, more stable holding or fixing becomes possible by pushing a part of the battery 11 fitted in with a holding means 12 provided at the case part 9. Therefore, it is so configured to be able to easily set or release the battery 11 to/from the case part 9 by operating the holding means 12 to be open/close.

In addition, because the battery 11 is externally installed, it is able to use a battery having a different capacity by exchanging freely. Namely, in case when the capacity of the battery is increased, the thickness thereof necessarily becomes thicker, but even the thicker battery can be installed without any limitation at the case part 9 side of the grip unit 7.

In brief, the battery can be installed to the grip unit 7 in spite of being thicker or thinner in the thickness thereof, and it can set in the same way if the thickness of the battery becomes thicker, it only protrudes by the increased thickness, and in addition, the thickness of the grip unit 7 increases by the increased thickness of the battery and the actual feeling of grasping feels slightly thicker and not only the operation is not disturbed at all, but also when the grip unit 7 is housed, the heavy battery 11 is positioned at a side face of the central part which is not apart from the center of the gravity, so that the total balance becomes better, and in addition, when in-use, the balance in the operation becomes better by positioning the heavy battery 11 in the hand.

To the camera body unit 2 of the side where the grip unit 7 is installed, a group of switches for operation is installed in a position in proximity to an axis unit 10. The group of these switches, for example, is a start/stop switch 13, a zoom switch 14, a shutter 15 for taking a still image, an on/off switch 16 for a super night shot, a night shot button 17, and the like, and the group of these switches is installed in the position that can be easily operated by means of a fore finger, for example, in the state when a user is holding the grip unit 7 by his/her right hand.

Furthermore, at one side of the camera body unit 2 where the grip unit 7 is installed, a setting mechanism unit 18 for installing/ejecting a cassette tape is provided, as shown in FIG. 2 and FIG. 3, and this setting mechanism unit 18 is provided to a position to be covered when the grip unit 7 is housed (in the state of FIG. 1).

In addition, the setting mechanism unit 18 is so configured as to be able to be open/close when the grip unit 7 is in an adequately opened state, namely, is rotated up to a position designated in FIG. 3, and in the in-use position as shown in FIG. 2, not to be able to be open/close.

One example of disenabling the opennig/closing is the one where a projecting portion 9a is formed at a position near the axis unit 10 of the case part 9 in the grip unit 7, and the mentioned projecting portion 9a prevents the opening/closing of the setting mechanism unit 18 of a cassette tape because it is in an overwrapping state over the setting mechanism unit 18 of a cassette tape when it is an in-use position (FIG. 2), and from this position, the grip unit 7 is further rotated in an opening direction, and when comes to a position designated in FIG. 3, the overwrapping of the projecting portion 9a is moved aside from the setting mechanism unit 18 of a cassette tape, and in this deviant position, the opening/closing of the setting mechanism unit 18 of a cassette tape becomes possible.

By the configuration as described above, its safety is adequately secured in the installing/ejecting work of a cassette tape to the setting mechanism unit 18 of a cassette tape. For example, if the setting mechanism unit 18 of a cassette tape is able to be open/close even when in a state where the grip unit 7 is opened up to a part of the way, then, a corner of the setting mechanism unit 18 collides with the grip unit 7, or a finger is nipped between the grip unit 7 in order to install/eject a cassette tape in the state where it is opened up to a part of the way, and it is because of avoiding a cause of trouble by such accidental hurt. Therefore, as the setting mechanism unit 18 of a cassette tape is set to be able to be open/close only in the case when the grip unit 7 is made in a completely opened state, it is determined to be such configuration that can avoid occurrences of various troubles before they happens.

Further regarding the rotational operation of the grip unit 7, and particularly when it is rotated to a housing (not in-use) position shown in FIG. 1, the setting mechanism unit 18 of a cassette tape does not have a chance to contact with the grip unit 7 because it is in a state dipped slightly from the surface of the camera body unit 2, but, an end portion 2a in the backside of the camera body unit 2 is formed as to come in contact with the grip unit 7 in order to maintain a stable housing state. At contacting portion of this end portion 2a, a protection member 19 formed by comparatively hard and slippery resin is fixedly provided in up and down directions so as not to have scratches by rubbing.

And a convex portion 20 that serves as a stopper and is longer in a crosswise direction is formed at the camera body unit 2 side so that the grip unit 7 does not exceed its rotation angle range, namely, it does not rotate over the housing (not in-use) position as shown in FIG. 1 even when it is strongly rotated in a housing operation of the grip unit 7.

Furthermore, in the grip unit 7, protection members 21, 22 such as rubber having flexibility and thin longer shape are installed to top and bottom edges of the case part 9, they become an antiskid when grasping the grip unit 7 owing to the existence of the protection members 21, 22, and further, when the camera body unit 2 is put on a desk, for example, while the grip unit 7 is in the housed state as shown in FIG. 1, the grip unit 7 is set not to directly contact with the desk because the protection member 22 on the bottom becomes a so-called stand, and accordingly, it does not hurt a disk top, and serves a roll as the antiskid even the place where it is put on is slanted a bit.

Figure 4:
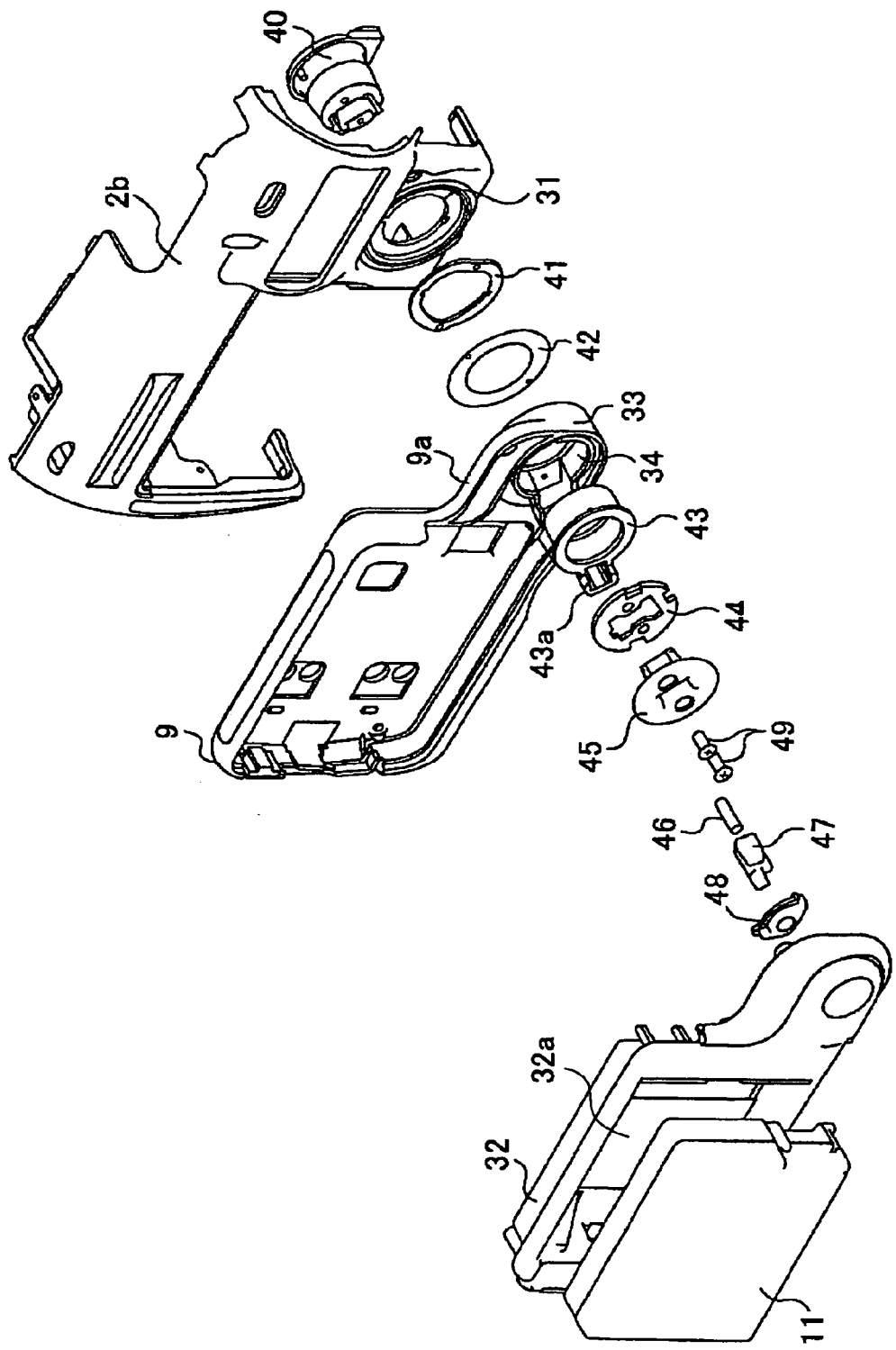
FIG. 4 is a perspective view of a relevant part designated by disassembling a installation mechanism of the grip unit in the same magnetic recording and/or reproducing apparatus.

Next, an installating configuration of the grip unit 7 to the camera body unit 2, particularly a further specific configuration of the lock mechanism and the grip unit 7 is explained based on FIG. 4.

At first, at a half body part composing the camera body unit 2, namely, at a corner portion of the front face side and also at the lower face side of the cabinet half body 2b, an attaching bore 31 for installing the grip unit 7 is formed. The grip unit 7 comprises the case part 9 made of metal, and a battery housing unit portion 32 made of resin, the grip unit 7 is configured in a state of combining them, and a housing unit 32a is formed at the battery housing unit portion 32. Further a mounting base unit 33 is provided at the case part 9, and an attachment bore 34 is formed at the mounting base unit 33 for installation.

For a member material comprising the installating configuration of the camera body unit 2 and the grip unit 7, it comprises an approximately trapezoidal grip base 40, a friction spring 41 having a ring shape as a whole and demonstrating a spring function, a washer 42, a slide ring 43, a lock disk 44, a harness protection member 45, a lock spring 46, a locking pawl member 47, and a lock operation button 48.

The above mentioned slide ring 43 is formed with comparatively slippery hard resin, it has some height, it is pipe-shaped as a whole, it is formed with a housing unit 43a provided at an upper periphery side thereof while projecting in a lateral direction, and it is so configured to house the lock spring 46 and the locking pawl member 47 being charged in the jumping direction in the housing unit.

Thus, the trapezoidal grip base 40 is arranged inside of the cabinet half body 2b relative to the attaching bore 31, the friction spring 41 and the washer 42 are arranged outside of the cabinet half body 2b, the mounting base unit 33 of the case part 9 is positioned by abutting to the washer 42, the slide ring 43 is inserted into the attaching bore 34 of the mounting base unit 33, the lock disk 44 is placed on the housing unit 43a of the slide ring 43 after being housed the lock spring 46 and the locking pawl member 47, and is fixed to the aforementioned grip base 40 by a suitable fixing member 49 such as screw or the like.

The slide ring 43, the lock disk 44, the harness protection member 45, the lock spring 46, the locking pawl member 47, and lock operation button 48 are housed within the mounting base unit 33 of the case part 9 at the grip unit 7 side by installing the harness protection member 45 formed with resin to the lock disk 44 and also by installing the lock operation button 48 as to cover the locking pawl member 47 and by fixing the battery housing unit part 32 integrating with the case part 9.

By installing as thus described, the grip unit 7 is made possible to rotate relative to the camera body unit 2 with a constant frictional force due to a repulsion power of the friction spring 41. In this case, the slide ring 43 fitted in the attachment bore 34 of the mounting base unit 33 in the case part 9 rotates together with the case part 9 by being installed in a non-sliding state, and rotates with slide between the lock disk 44 fixed to the grip base 40 and the slide ring 43, and their rotation is positioned and locked with a feeling of click within a constant angle range.

Figure 5:
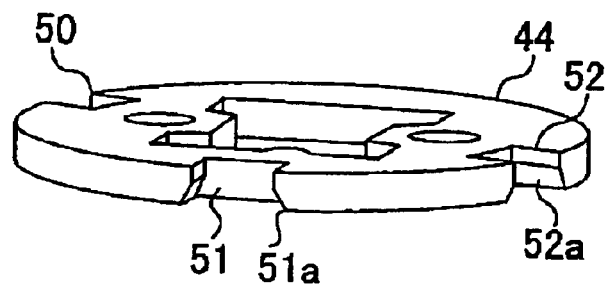
FIG. 5 is a perspective view of a relevant part designated by enlarging a lock disk of a lock mechanism in the same installation mechanism.
Figure 6:
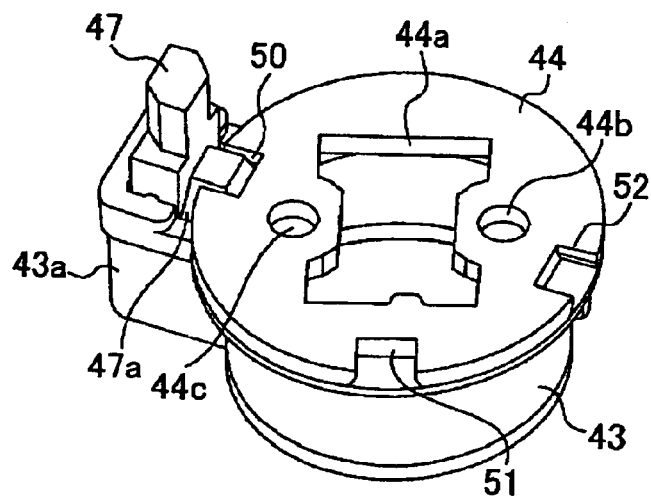
FIG. 6 is a perspective view of a relevant part for explaining an engaging state between the lock disk and a locking pawl member in the same lock mechanism.
Figure 7:
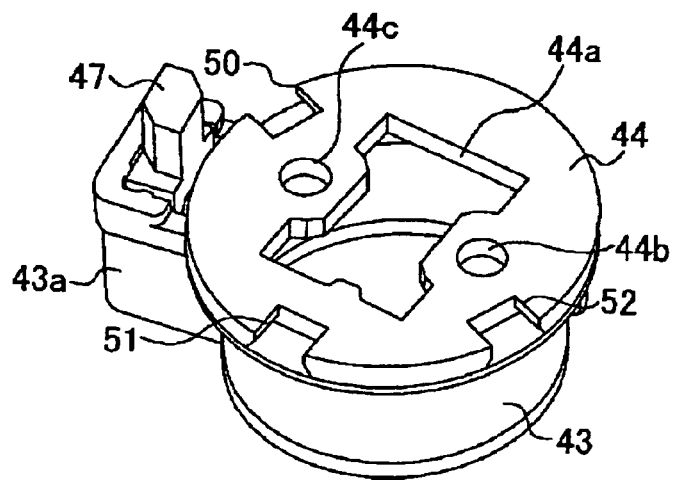
FIG. 7 is a perspective view of the relevant part for explaining a disengaging state between the lock disk and the locking pawl member in the same lock mechanism.

The lock mechanism thereof is explained with reference to FIGS. 5 to 7. The lock disk 44 has a circular form as a whole, and a penetration bore 44a having approximately a rectangular shape for penetrating a wire harness at a central portion thereof is formed and further, screw bores 44b, 44c for fixing with the fixing member 49 are provided. And cutout portions 50, 51, 52 for positioning at three positions, namely for locking are provided at a peripheral section.

Each of these cutout portions 50, 51, 52 has a ⊐character shape, and in a rotation angle range of 180 degrees, the cutout portion 50 is provided corresponding to a housing position of the grip unit 7, the cutout portion 51 is provided corresponding to the in-use position, and the cutout portion 52 is provided corresponding to an installing/ejecting position of a magnetic tape cassette. In this case, the cutout portion 50 and the cutout portion 52 are formed opposite to each other on a line passing through the center of the lock disk 44, and the cutout portion 51 is formed at a position within a rotation angle range of about 100 to 120 degrees from a position of the cutout portion 50 for the housed position.

And each of the cutout portions 50, 51, 52 has a size for the locking pawl member 47 to be engaged or fitted in and is formed as a tapered surface 50a, 51a, 52a to open an end edge side contacting to the slide ring 43 to outside. Further, the locking pawl member 47 is formed with a tapered engaging portion 47a roughly corresponding to aforementioned tapered surface 50a, 51a, 52a at a position where it is engaged with or is fitted in these cutout portions.

Thus, a spring-biased engaging portion 47a of the locking pawl member 47 is to be locked at a position engaged with or fitted in respective cutout portion 50, 51, 52, the housing position of the grip unit 7, the operating position thereof, and the install/eject position of a magnetic tape cassette are positioned by being locked, and when the grip unit 7 is rotated from each those positions, the slide ring 43 rotates together because it is able to be rotated as the engaging portion 47a is depressed down by the tapered surface 50a, 51a, 52a of the lock disk 44 of the fixed side, and when the engaging portion is engaged with or fitted in the next cutout portion, the lock is, at any rate, done by fitting in with a click sound and generating a click feeling.

In addition, as the lock operation button 48 is installed in an exposed state at the mounting base unit 33 side of the grip unit 7, the locking pawl member 47 is depressed against the lock spring 46 by slightly pushing the lock operation button 48, the lock state is released by disengaging the engaging portion 47a from the cutout portion, and the rotating operation of the grip unit 7 can be done comparatively easily because it becomes only a rotating resistance by a repulsion power of the friction spring 41.

In addition, the harness protection member 45 is a thing to protect wiring for supplying a power to the camera body unit 2 from the battery 11 installed to the grip unit 7, and preferably is formed from relatively soft resin materials, and is so arranged that the wiring does not touch to the lock disk 44, the attachment bore 34, and an edge portion of the attaching bore 31.

At all events, the magnetic recording and/or reproducing apparatus 1 of the build-in video type camera relating to the present invention, the grip unit 7 serves as a housing of the battery 11, the camera body unit 2 can be miniaturized, and further even if the camera body unit 2 is miniaturized, and not only a difficulty in holding is canceled by the existence of the grip unit 7, but also components of each part, namely the degree of freedom of allocating each devices is not deteriorated, and the installation of the battery 11 is done to the grip unit 7, the radiation area for heat can be adequately secured.

Furthermore, the grip unit 7 can be rotated within an rotation angle range of 180 degrees relative to the camera body unit 2, and is possible to be locked at a predetermined position, and further as the lock state is held when it is housed or when it is in-use, and it can feel relieved at the time of carrying out or in-use, and there is a convenience where when in-use, the battery is warmed by grasping, and the life for use thereof is extended.

In addition, for example, when in-use, in case when the camera is wanted to be set toward a skewed direction while a lens unit is directed slightly upward, by opening the grip unit 7 in accordance with the angle, the opened angle can be held by the frictional force owing to the repulsion power of the friction spring 41 without action of the lock mechanism, and besides, as the grip unit 7 installed with the heavy battery 11 functions as a tentative support, it can set to an arbitrary angle without the camera body unit 2 being turned over.

In more addition, when in-use and in a state where the grip unit 7 is housed in the camera body unit 2, it is possible to take images by holding the camera body unit 2 as to grasp from upward, by opening the display unit 8 and directing slightly upward, by bracing the camera body unit 2 at a lower position while watching the display unit 8, and by operating the start/stop switch 13 and the zoom switch 14 using the forefinger. Therefore, it is able to take a case where it is used to hold the camera body unit 2 above while taking the grip unit 7, and a case where it is used to hold the camera body unit 2 below while grasping with one hand.

INDUSTRIAL APPLICABILITY

As discussed above, the magnetic recording and/or reproducing apparatus relating to the present invention is the magnetic recording and/or reproducing apparatus which comprises a camera body unit including, at least, a lens, a view finder, and a group of operation buttons, and a grip unit installed to be open/close or to be rotatable to the camera body and is combined with a battery housing unit, and is so configured wherein the above mentioned battery housing unit is provided to be rotatable in a vertical direction to one side of the camera body unit through an rotational axis and is equipped with the lock mechanism to be maintained in a locked state at a preset position, and accordingly, when the camera body unit is miniaturized, it is possible not only to effectively arrange each devices, and to improve the operability without destroying limitation in a design, but also to be easy in handling by setting the grip unit at the in-use position even when the camera body unit is miniaturized.

In addition, the battery housing unit is made to be the grip unit, and the battery can be externally installed, so that it is possible to easily exchange the one having a different battery capacity, and also, it becomes a state where the battery is grasped by hand in-use, so that the usable life of the battery can be extended by being warmed.

What is claimed is:

1. A magnetic recording and/or reproducing apparatus comprising:
 a main body including:
 a lens,
 a cassette setting mechanism,
 a view finder, and
 a group of operation buttons; and
 a grip unit including a battery housing unit, wherein
 said grip unit is rotatably mounted on said main body around a rotation axis perpendicular to one side surface of said main body, and has a lock mechanism to maintain a lock state at a preset position, and
 said cassette setting mechanism is adapted to hold/eject a cassette tape in said main body and is provided on said one side surface of said main body, and
 said grip unit is adapted to cover said cassette mechanism.

2. The magnetic recording and/or reproducing apparatus as claimed in claim 1, wherein
 a battery is mounted to an external side of said battery housing unit.

3. The magnetic recording and/or reproducing apparatus as claimed in claim 1, wherein
 said preset position is one of a housing position and an in-use position of said grip unit, and a position where said cassette tape is installed/ejected to/from the main body.

4. The magnetic recording and/or reproducing apparatus as claimed in claim 1, wherein
 said lock mechanism comprises:
 a slide ring including a locking pawl member; and
 a lock disk having a plurality of cutout portions for engagement with said locking pawl member.

5. The magnetic recording and/or reproducing apparatus as claimed in claim 1 or claim 4, further comprising
 a lock operation button for releasing said lock state.

* * * * *